United States Patent [19]

McCormick

[11] Patent Number: 4,817,729

[45] Date of Patent: Apr. 4, 1989

[54] HINGED CULTIVATOR FRAME

[76] Inventor: Patrick R. McCormick, P.O. Box 96, Lloydminster, Saskatchewan, Canada, S9V 0X9

[21] Appl. No.: 156,214

[22] Filed: Feb. 16, 1988

[51] Int. Cl.⁴ .............................................. A01B 73/04
[52] U.S. Cl. .................................... 172/311; 172/776; 172/633
[58] Field of Search ............... 172/776, 142, 483, 311, 172/314, 657, 743, 310, 323, 633, 312, 313

[56]  References Cited
U.S. PATENT DOCUMENTS

| | | | |
|---|---|---|---|
| 709,589 | 9/1902 | Upton | 172/776 X |
| 3,744,570 | 7/1973 | Krammer | 172/310 |
| 4,105,077 | 8/1978 | Seifert, Jr. | 172/629 X |
| 4,121,852 | 10/1978 | Quanbeck | 172/314 X |
| 4,676,321 | 6/1987 | Friggstad | 172/776 |
| 4,683,957 | 8/1987 | Bussiere | 172/776 X |

Primary Examiner—Richard J. Johnson
Assistant Examiner—Jeffrey L. Thompson
Attorney, Agent, or Firm—Murray E. Thrift; Stanley G. Ade; Adrian D. Battison

[57]  ABSTRACT

The present invention relates to a cultivator having a frame which includes at last one line of hinges with axes transversely disposed to the direction of draft of the cultivator. The portion of the cultivator frame ahead of the front row of hinges is known as the leading tool-carrying frame and carries a row of shanks with cultivator shovels disposed abreast along the length of the leading tool-carrying frame. One or more additional rows of hinges with axes transversely disposed to the direction of draft can be provided in the cultivator frame to the rear of the front row of hinges. The frame-work depending upon and following behind a given row of hinges is known as a following tool-carrying frame. Each following tool-carrying frame also carries a row of cultivator shanks. The provision of each of these rows of hinges with axes transversely to the direction of draft provides an additional degree of freedom for the cultivator frame to conform to knolls or depressions in an agricultural field. Each leading and following tool-carrying frame is supported by its own separate row of wheels to cause each section of tool-carrying frame to be maintained more closely to a selected distance above the soil. The present cultivator frame has as well rows of hinges each row having a common axis parallel with the direction of draft. Prior art cultivator frames have of course had hinge joints with axes parallel to the direction of draft.

10 Claims, 2 Drawing Sheets

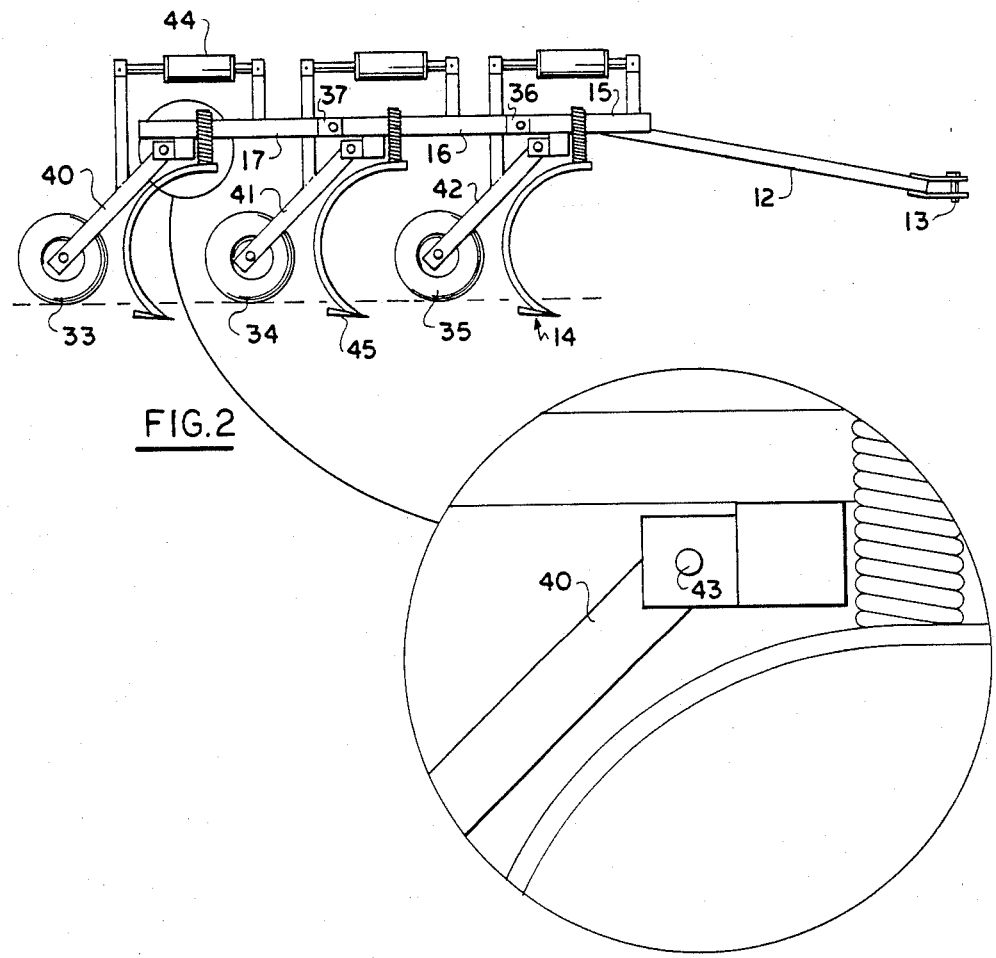

HINGED CULTIVATOR FRAME

BACKGROUND OF THE INVENTION

The present invention relates to equipment for tillage of agricultural soil and in particular to a cultivator having a frame adapted to flex at hinge joints while passing over the surface of knolls and depressions found in typical agricultural fields.

Cultivators per se are of course well known. They generally comprise a horizontal frame on which are mounted shanks complete with cultivator shovels such as sweeps or points. The shanks are directed downwardly for tilling soil and the cultivator frame is typically pulled by a farm tractor during cultivating operations.

It is generally desirable to maintain all cultivator shovels at a uniform depth in the soil during cultivating operations. This is particularly so if the cultivator is used as a portion of a seeding apparatus generally known as an "air seeder" to those involved in grain farming. While using an air seeder, if one shovel is shallow in the soil, the seed grain planted behind that shovel may be in drier surface soil and may not germinate as soon as seed grain planted more deeply. Moreover, some of the kernels which are planted shallow may not germinate until after the first rainfall subsequent to seeding. The plants which grow from these late germinating seed grains may lag behind other plants in maturing so that at harvest time the grain harvested may contain some immature kernels. Green and otherwise immature kernels in a grain sample may cause the loss of a grade in quality for the crop with an attendant loss of revenue to the farmer. Likewise, if a shovel is too deep during seeding using an air seeder, the seed grain planted behind that shovel may germinate at the same time as other seed grain but may take longer to emerge from the soil. Plants which emerge later from the soil may reach maturity later depending upon weather conditions.

Cultivator shanks typically are mounted on the frame of a cultivator and adjustment of the depth of working of the shovels in soil is accomplished by adjusting the height of the frame above the soil. However, if the ground is not smooth and the cultivator frame is rigid, some shovels disposed away from the frame support wheels tend to work the soil to either too deep or too shallow a depth.

A cultivator generally has shovels arranged in parallel transversely aligned rows and quite often these rows are three in number. Each row has shovels spaced apart to permit the passage of trash, such as excess straw, between the shovels. The shovels in the rows which follow the leading row are aligned to till that soil not tilled by the shovels in the leading row. It is generally believed that cultivators with only two rows of shovels are more susceptible to being plugged due to collection of trash as they are drawn over fields, as compared to cultivators with three rows of cultivator shovels. This is believed to be because of the closer lateral spacing of cultivator shovels on cultivators with two rows of shovels. Moreover, it is believed that close forward to rearward spacing between rows of cultivator shovels also impedes the free flowing of trash through the cultivator as the cultivator passes over a field. According to this understanding, increasing either the forward to rearward spacing between rows or the number of rows of cultivator shovels tends to improve the ability of a cultivator to pass over trash without collecting it. However, either of the aforementioned increases tends to make control of the depth of cultivation more difficult in conventional cultivators particularly in respect of shovels which are disposed at increased distances from frame support wheels. Thus, there is a need for a cultivator frame which will permit increased control of depth of cultivation while allowing the cultivator shanks to be suitably spaced for permitting trash to clear the cultivator during cultivating operations.

SUMMARY OF THE INVENTION

It is therefore an aim of the present invention to obviate or mitigate the disadvantages and difficulties of the prior art.

According to the present invention, there is provided a cultivator adapted to be drawn in a forward direction of draft by a tractor over an agricultural field, said cultivator comprising:

a plurality of interconnected tool-carrying frames, said plurality of interconnected tool-carrying frames including a leading tool-carrying frame and at least one following tool-carrying frame said leading and following tool-carrying frames being arranged in contiguous relationship one after another forwardly to rearwardly;

each said following tool-carrying frame being connected with a tool-carrying frame disposed immediately forwardly thereof by longitudinal hinge means, each said longitudinal hinge means having a hinge axis substantially perpendicular to and transversely of said direction of draft; and support wheels attached to each of said tool-carrying frames for supporting the frames.

DESCRIPTION OF THE DRAWINGS

The invention and the advantages thereof will be more fully explained by reference to preferred embodiments described in relation to the drawings in which:

FIG. 2 illustrates a diagrammatic side view of a cultivator according to a preferred embodiment of the present invention complete with an enlargement of a portion of the view.

Figure 1:
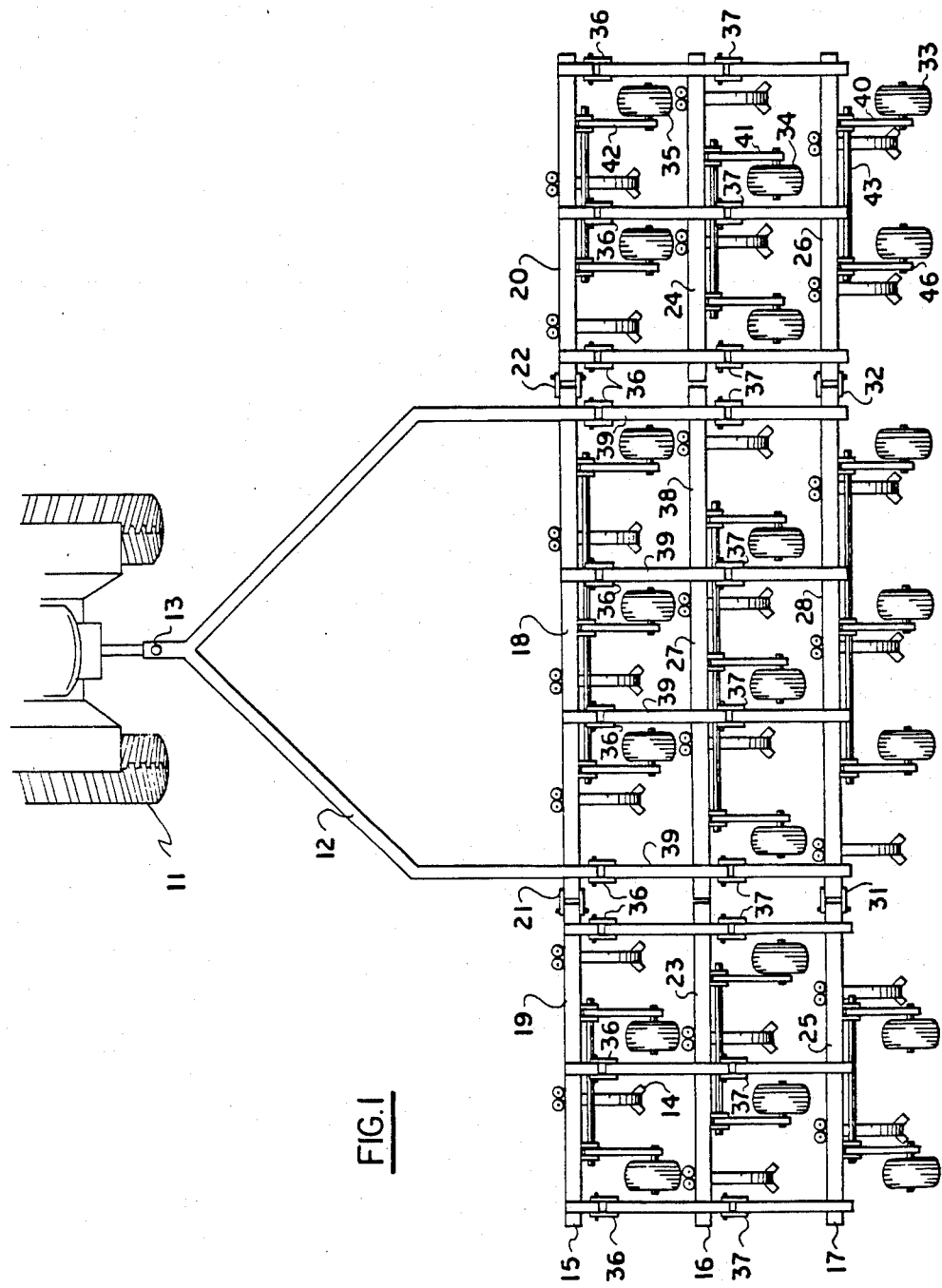
FIG. 1 illustrates a diagrammatic plan view of a cultivator according to a preferred embodiment of the present invention.

A particular reference numeral illustrated in more than one Figure indicates the same element illustrated in the separate Figures.

DESCRIPTION OF PREFERRED EMBODIMENTS

Turning to FIG. 1 there is illustrated a diagrammatic plan view of a cultivator according to a preferred embodiment of the present invention. While FIG. 1 illustrates a method of practising the present invention it should be noted that for the sake of clarity it does not include certain common mechanical details such as stiffening members or lifting apparatus such as hydraulic cylinders.

The cultivator is typically pulled by an agricultural tractor 11 which is connected to a hitch 12 of the cultivator by means of a draw pin 13. As the cultivator is pulled in a forwardly direction over an agricultural field the height of the cultivator frame is raised or lowered in order to adjust the depth of working of shovels 14 in the ground. The cultivator frame includes hitch 12, a leading tool-carrying frame 15 and following tool-carrying frames 16 and 17. The leading tool-carrying frame 15, and likewise the following tool-carrying frames 16 and 17, each comprise in this embodiment three sections such as, in the case of leading tool-carrying frame 15, a central section 18 and wing sections 19 and 20. Wing sections 19 and 20 are connected by hinge joints 21 and 22 respectively to central section 18. Wing sections 25 and 26 of the following tool-carrying frame 17 are connected as illustrated to the central section 28 of the following tool-carrying frame 17 by hinge joints 31 and 32 respectively. The wing sections 23 and 24 of frame 16 are not connected to the central section 27. Thus hinge joints, 21 and 31 permit the cultivator frame to flex with bending along the common axis of hinge joints 21 and 31. Similarly hinge joints 22 and 32 permit the cultivator frame to flex by bending along the common axis of hinge joints 22 and 32. Hinge joints 21, 31, 22 and 32 also permit the cultivator frame to be folded in a conventional fashion for transporting over roadways. While additional hinges may be provided between the sections of frame 16, this is not preferred as it can cause some difficulty in folding the wings where the cultivator is not on level ground.

With reference to FIG. 1, following tool-carrying frame 16 hinges with respect to leading tool-carrying frame 15 along a line through the axes of hinges typically indicated by reference numeral 36. Likewise, following tool-carrying frame 17 hinges with respect to following tool-carrying frame 16 along a line through the axes of hinges typically indicated by reference numeral 37. It should be noted that an additional following tool-carrying frame could be attached by hinge means behind following tool carrying frame 17 in a like manner to the attachment of following tool-carrying frame 17 behind following tool-carrying frame 16. The additional following tool-carrying frame would permit the shanks on each of the tool-carrying frames to be spaced at a greater distance from each other because the same number of shanks would be placed on four tool-carrying frames rather than three. Increased spacing of cultivator shanks and shovels is sometimes desirable as it permits the cultivator to more readily cultivate trash covered fields without plugging due to collection of trash.

For purposes of clarity, it should be noted that central section 27 of following tool-carrying frame 16 includes a main cross member 38 and forward to rearward beams indicate typically by reference numeral 39. The other sections of other following tool-carrying frames are similarly constructed in this embodiment.

Turning to FIG. 2, frame support wheels 33, 34 and 35 are mounted on frame support arms 40, 41 and 42 respectively. Frame support arm 40 is rigidly mounted on a shaft 43 which is journalled on the rear of following tool-carrying frame 17. A hydraulic piston/cylinder device 44 is attached as illustrated for moving frame support arm 40 relative to following tool-carrying frame 17 so that upon extension of piston cylinder device 44 frame support arm 40 and shaft 43 pivot with respect to following tool-carrying frame 17 and raise the rear of tool-carrying frame 17. In a preferred embodiment, extension or retraction of all hydraulic piston/cylinder devices, such as hydraulic/cylinder device 44, occurs uniformly and simultaneously so that all frame support arms such as frame support arms 40, 41 and 42 pivot uniformly and simultaneously with respect to their respective tool-carrying frames. By this means frame support wheels such as frame support wheels 33, 34 and 35 tend to support the tool-carrying frames, such as leading tool-carrying frame 15, following tool-carrying frame 16 and following tool-carrying frame 17 each at a uniform distance above the ground beneath it. Turning to FIG. 2, if a knoll exists in the area of ground beneath wheel 34, the cultivator frame conforms to the knoll by arching upward by bending of hinge 37. Likewise, if a knoll exists under either of frame support wheels 33 or 35 the cultivator frame is capable of flexing upward in the locality of the knoll. As any given wheel rides over a knoll that wheel lifts the frame above that wheel and thus lifts those shovels in the immediate vicinity of the knoll. Thus all cultivator shovels tend to be maintained more closely to a selected working depth.

Turning to FIG. 1, it should be noted that, hitch 12 is rigidly attached with central section 18 of leading tool-carrying frame 15. Thus, when hitch 12 is attached by draw pin 13 to tractor 11, leading tool-carrying frame 15 is impeded from rotating about an axis parallel to the axes of hinges 36. Thus leading tool-carrying frame 15 provides a stable base with respect to which frame support arms attached therewith, such as frame support arm 42, can be forceably pivoted.

Turning to FIG. 2, an advantageous arrangement of hydraulic piston/cylinder devices can be provided wherein one hydraulic piston/cylinder device, such as piston/cylinder device 44, pivots all those frame support arms which are found on a given section of a tool-carrying frame. Thus, as illustrated in FIG. 1, one hydraulic piston/cylinder device 44 would pivot frame support arms 40 and 46 which are rigidly joined by shaft 43.

While only certain embodiments of the present invention have been described it will be apparent to those skilled in the art that various changes and modifications can be made therein without departing from the scope of the invention as claimed.

I claim:
1. A cultivator adapted to be drawn in a forward direction of draft by a tractor over an agricultural field, said cultivator comprising:
a plurality of interconnected tool-carrying frames, said plurality of interconnected tool-carrying frames including a leading tool-carrying frame and at least one following tool-carrying frame, said leading and following tool-carrying frames being arranged in contiguous relationship one after another forwardly to rearwardly;
each said tool-carrying frame comprising a plurality of sections arranged abreast transversely of said direction of draft;
each said following tool-carrying frame being connected with a tool-carrying frame disposed immediately forwardly thereof solely by longitudinal hinge means each said longitudinal hinge means having a single hinge axis substantially perpendicular to and transversely of said direction of draft; and
support wheels attached to each of said tool-carrying frames for supporting the frames.
2. A cultivator, as claimed in claim 1,
wherein a hitch means is connected with said leading tool-carrying frame for transmission of pulling force from a tractor and wherein said hitch means is adapted for resisting rotation of said leading tool carrying frame relative to said hitch means about an axis substantially perpendicular to and transversely of said direction of draft, and wherein the support wheels are disposed along the lateral extent of each of said tool-carrying frames;

and wherein said support wheels are aligned for pulling of said cultivator in a forwardly direction.

3. A cultivator as claimed in claim 1 wherein two of said frames include lateral hinge means connecting contiguous lateral ends of the frame sections for free pivotal movement of the sections about a hinge axis substantially parallel to said direction of draft, and wherein said lateral hinge means are provided at corresponding positions on the lateral extent of each of said two tool-carrying frames.

4. A cultivator, as claimed in claim 2 wherein each said tool-carrying frame comprises:

a plurality of sections arranged abreast transversely of said direction of draft.

5. A cultivator as claimed in claim 4 wherein two of said frames include lateral hinge means connecting contiguous lateral ends of the frame sections for free pivotal movement of the sections about a hinge axis substantially parallel to said direction of draft, and wherein said lateral hinge means are provided at corresponding positions on the lateral extent of each of said two tool-carrying frames.

6. A cultivator, as claimed in claim 1 wherein each said tool-carrying frame has a front and a rear and, wherein each of said tool-carrying frames is supported by said support wheels attached therewith and located to the rear thereof and, wherein each of said following tool-carrying frames is supported by said tool-carrying frame disposed immediately forwardly thereof.

7. A cultivator, as claimed in claim 2, wherein each said tool-carrying frame has a front and rear and, wherein each of said tool-carrying frames is supported by said support wheels attached therewith and located to the rear thereof and, wherein each of said following tool-carrying frames is supported by said tool-carrying frame disposed immediately forwardly thereof.

8. A cultivator, as claimed in claim 1, wherein the support wheels attached with each of said tool-carrying frames are movable by actuating means vertically relative to said tool-carrying frame without substantial reorientation of the frame relative to the ground, whereby the vertical displacement of said tool-carrying frame above the surface of said field is adjustable.

9. A cultivator, as claimed in claim 2, wherein the support wheels attached with each of said tool-carrying frames are movable by actuating means vertically relative to said tool-carrying frame without substantial reorientation of the frame relative to the ground, whereby the vertical displacement of said tool-carrying frame above the surface of said field is adjustable.

10. A cultivator, as claimed in claim 3, wherein the support wheels attached with each of said tool-carrying frames are movable by actuating means vertically relative to said tool-carrying frame without substantial reorientation of the frame relative to the ground whereby the vertical displacement of said tool-carrying frame above the surface of said field is adjustable.

* * * * *